Nov. 28, 1950 R. K. POTTER 2,531,642
MAGNETIC TRANSDUCING SYSTEM
Filed Oct. 30, 1947 2 Sheets-Sheet 1
FIG. 1A
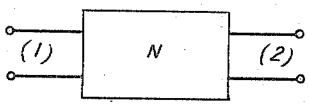
FIG. 1B
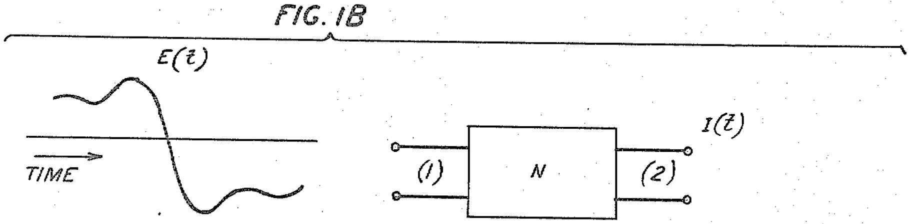
FIG. 1C
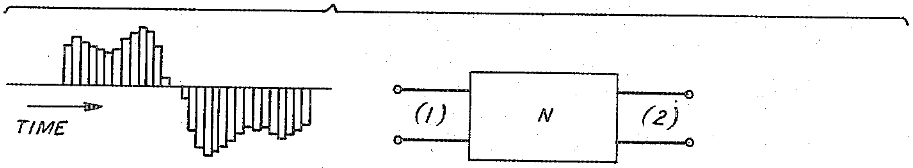
FIG. 1D
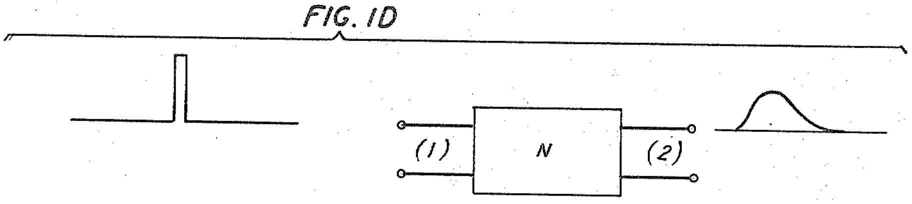
FIG. E
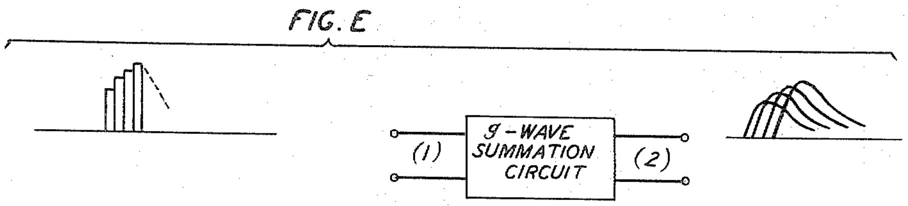
FIG. 2A FIG. 2B
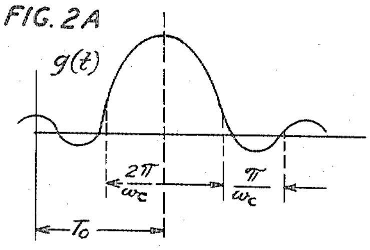
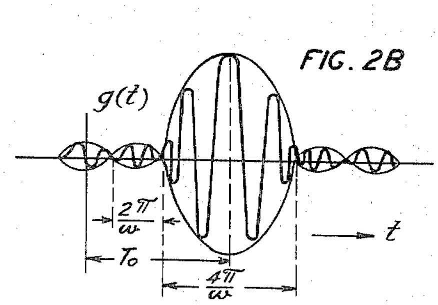
INVENTOR
R. K. POTTER
BY
N. S. Ewing
ATTORNEY Nov. 28, 1950 R. K. POTTER 2,531,642

MAGNETIC TRANSDUCING SYSTEM

Filed Oct. 30, 1947 2 Sheets-Sheet 2

INVENTOR
R. K. POTTER
BY
N. D. Ewing
ATTORNEY

Patented Nov. 28, 1950

2,531,642

UNITED STATES PATENT OFFICE 2,531,642

MAGNETIC TRANSDUCING SYSTEM

Ralph K. Potter, Morristown, N. J., assignor to Bell Telephone Laboratories, Incorporated, New York, N. Y., a corporation of New York Application October 30, 1947, Serial No. 783,057

9 Claims. (Cl. 179—100.2)

This invention relates to the modification of time-varying functions in accordance with preselected patterns; more particularly, it relates to electrical transducers of the types which are known in the art as transversal filters.

The behavior of electrical networks can be specified in two ways representing two different physical points of view. Ordinarily, one thinks first of the well-known steady-state point of view which describes the network performance in terms of the concepts of amplitude and phase response versus frequency. In addition to this more conventional viewpoint there is the time function viewpoint in which the network is described in terms of its amplitude time response at the receiving end resulting from the application of an impulse of infinitesimal duration at the sending end. Network response may thus be considered either in terms of frequency or time functions. The bridge between these two avenues of approach is the Fourier integral which may be thought of as a mathematical device for expressing a time function in terms of steady-state phenomena.

For the most part prior art practice has been to base the design of communication networks upon the steady-state frequency-amplitude characteristics and an elaborate theory has been worked out for such design procedures. The networks thus obtained contain as elements, resistances, inductances and capacitances, the frequency and/or phase selective effects of which are used in various combinations to secure desired response characteristics.

On the other hand, when network design is considered from the time function point of view, that is when time rather than frequency is taken as the independent variable, one is led to a broad group of selective circuits whose principle of operation does not depend upon resonant combinations of network elements.

Selective circuits embodying the time-function concept have been disclosed in Patents 2,024,900, December 17, 1935, 2,124,599, July 26, 1938, and 2,128,257, August 30, 1938 to N. Wiener and Y. Lee; in application Serial No. 731,232, filed February 27, 1947, by L. C. Peterson and R. K. Potter and elsewhere in the art.

It is the principal object of this invention to provide certain improvements in the art of modifying given functions of time in accordance with desired patterns of amplitude, frequency, and phase variation.

A more specific object of this invention is to utilize magnetic recording and reproducing techniques and apparatus for modifying an impressed electrical input in accordance with a preselected admittance function.

A certain class of devices, known in the art as transversal filters, substitute the time-function approach for the conventional steady-state approach in the simulation of network response, operating through a series of steps which include the following:

(1) Recording or storing the input signal (2) Weighting the stored record in accordance with a predetermined multiplying function; and (3) Integrating the weighted increments of record to produce a modified output The present invention relates to a transversal filter comprising a magnetic recording and reproducing system.

The function to be filtered is recorded on a magnetic tape which is subsequently passed through a reproducing system having a plurality of spaced pick-up points. The amount of pick-up is varied from point to point over the pick-up interval in accordance with a predetermined weighting function; and the weighted increments of current from the respective points are continuously summed to produce the desired filtered output current.

In accordance with one system of the present invention, a magnetic recording tape is progressively moved past a magnetic recording device comprising a core longitudinally disposed with respect to the recording tape, and separated across the width of the tape into a plurality of alternate magnetic and non-magnetic sections or laminations which are cut by a laterally extending air-gap adjacent to which the tape passes. A coil, comprising parallel wires joined at one end and connected at the other end to an electrical signal source, is substantially aligned above the air-gap so as to cut the separate flux paths of the magnetic sections of the core, whereby a multiplicity of substantially parallel records of the impressed signal are produced on the passing magnetic tape. The composite record so produced is passed through a reproducing device having a similarly subdivided core with a laterally extending air-gap, and a reproducing coil aligned thereabove, which coil is shaped in accordance with a predetermined weighting function to receive varying amounts of flux from the separate magnetic sections. The coil is coupled to an output circuit which serves to collect and integrate the increments of induced current. Either the air-gap in the recording device or that in the reproducing device is disposed at an oblique angle with respect to the direction of travel of the recording tape, so that each of the magnetic sections of the core in the recording device is adjacent at any one time to a point on the record representing a different instant in the history of the input signal.

Several alternative forms of the system are described.

Other objects and features of the present invention will be understood from a study of the detailed specification hereinafter and the attached drawings, in which:

Figs. 1(A) to 1(E) present a series of diagrams illustrating the theory of operation of transversal filters;

Figs. 2(A) and 2(B) show graphs of two specific filter characteristics;

Figure 3A:
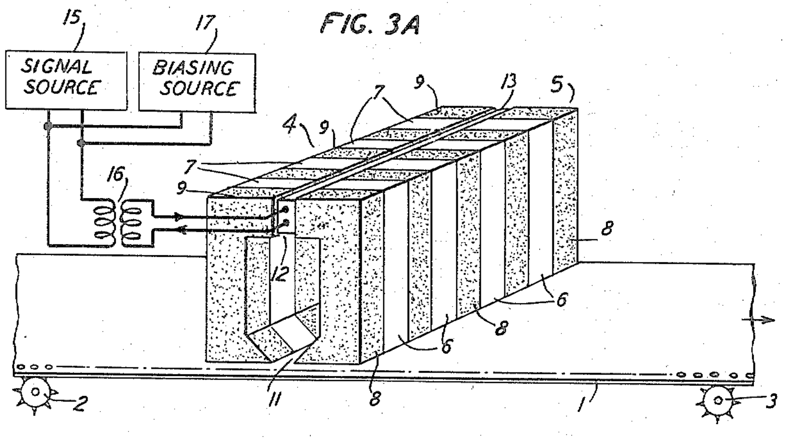
Fig. 3(A) shows a composite magnetic recording device operating on a moving magnetic tape at a plurality of points disposed obliquely with respect to its length.

A concept which may be helpful in interpreting the specification and claims hereinafter is that of the transfer indicial admittance of a system. This quantity is defined by J. R. Carson in Electric Circuit Theory and the Operational Calculus, McGraw-Hill, 1926, page 14, as the ratio of the output current of the system, expressed as a time-function, to the magnitude of the steady electromotive force suddenly inserted at the input of the system at time $t=0$.

The time-rate-of-change of the transfer indicial admittance defined above is a function of time designated $g(t)$. The function $g(t)$ is variously referred to in the specification and claims hereinafter as the "impulse response" or merely the "$g$-function" of a system.

Further discussion and definition of certain mathematical concepts, such as that of the "unit impulse," which will be relied on in the detailed description hereinafter, will be found in volume I of Transients in Linear Systems by Gardner and Barnes, John Wiley and Sons, 1942, pages 255–263.

The broad principles upon which the time-function point of view is based are illustrated in Figs. 1(A) to 1(E), to which reference is now made. Consider a frequency selective network such as is illustrated schematically by N in Fig. 1(A). Let us assume that the complex voltage wave $E(t)$ shown in Fig. 1(B) which is any continuous function of voltage versus time, is impressed upon the input 1 of the network. At the output 2 there will then appear a current wave which we designate as $I(t)$. Now let it be supposed that the voltage wave $E(t)$ is split up into a series of narrow pulses as shown in Fig. 1(C). With this pulsed wave impressed upon the input terminals 1, one should expect to obtain at the output terminals 2 very nearly the same current wave $I(t)$ obtained before.

Now referring to Fig. 1(D), assume that there is impressed upon the network a single pulse of the sort into which the voltage wave $E(t)$ has been subdivided. At the network output terminals 2 there now appears a function which as the pulse width approaches zero is proportional to the "$g$-function" of the network as defined above. It should be noted that any other pulse of different amplitude results in the same approximate "$g$-function" except that its amplitude varies in proportion to the applied pulse amplitude and that moreover its time of occurrence depends on the time of pulse application. Thus it follows as shown in Fig. 1($e$) that in the limit the current wave $I(t)$ which appears at the output terminals 2 as a result of the application of the voltage wave $E(t)$ at the input terminal 1 is the sum of a number of overlapping "$g$-functions" whose relative strengths or amplitudes vary in accordance with the impressed voltage wave $E(t)$. Using somewhat more precise language one can say that if the network is subjected at the input 1 to an initial pulse at some arbitrary time, which for convenience may be called zero, and if this pulse is followed by others at specified values of time, the total response at the output terminals 2 at any later time will be the sum of the responses which have occurred up to that time.

Thus two important principles applicable to this approach to network theory may be derived from the above. First, the network response to unit impulse of infinitesimal duration completely determines the response to any other input wave. Second, the response at any time depends upon the history of the applied input wave previous to the time in question so that the past history must be available at least over a time interval within which the "$g$-function" is of appreciable magnitude.

Therefore the network can be looked upon as a circuit for effecting the summation of a series of time displaced "$g$-functions" in which the individual amplitude of each of the respective "$g$-functions" is proportional to the corresponding time-displaced instantaneous value of the impressed voltage wave $E(t)$. This process is schematically indicated in Fig. 1(E).

Adopting a slightly different point of view one can also look upon the output wave as representing at any time a weighted history or record of the input wave where the "$g$-function" has acted as the weighting factor.

The foregoing statements may be summarized by deriving a mathematical expression for the network response to an arbitrary driving force from the assumption that the net behavior of a linear system at any instant is a function of the linear superposition of all the responses which have occurred up to that time counting from some arbitrary starting point. Assume, for example, that a network is subjected to an initial voltage pulse $E(t)$ at the time $t=0$ and that this pulse is followed by others at specified values of time. Then the total response at any later time will be the sum of the responses which have occurred up to that time, due allowance being made for the time at which each pulse was applied.

Let the time axis then be divided into short intervals $\Delta\tau$ of equal width, the electromotive force $E(t)$ being approximated by a series of rectangular pulses applied for the duration of each time interval $\Delta\tau$. The total response at a specified time $t$ is then approximately the sum at that instant of all the elementary responses started previous to that instant. If the interval $\Delta\tau$ is very small, that is, approaches zero as a limit, the response at time $t$ to the first impulse is $\Delta\tau E(0)g(t)$, where $g(t)$ is the response to unit impulse or "$g$-function" as defined hereinbefore, and where $E(0)$ is the amplitude of the voltage wave $E(t)$ at time $t=0$. Consider now the $(n+1)$th impulse. The response at time $t$ is $E(n\Delta\tau)\Delta\tau g(t-n\Delta\tau)$. In this expression it should be noted that $n\Delta\tau$ is the time of impulse application. The reason that the argument of the "$g$-function" in this latter expression is $t-n\Delta\tau$ and not $t$ is that this pulse does not come into existence until the time $n\Delta\tau$ and the expression is only valid for the time equal to or greater than $n\Delta\tau$. Assume an arbitrary point on the time scale to be denoted by $\tau$, thus $\tau=n\Delta\tau$. The current response $I(t)$ at the instant $t$ is the sum at time $t$ of all elementary responses that have occured between time equal to 0 when the first impulse was started and time $t$ as the length of the time interval $\Delta\tau$ approaches zero. Hence $$I(t)=\lim_{\Delta\tau\to 0}\sum_{\tau=0}^{\tau=t}E(t)\Delta\tau g(t-\tau) \qquad (1)$$

By defiinition of an integral this may also be written $$I(t)=\int_0^t E(\tau)g(t-\tau)\,d\tau \qquad (2)$$

or $$I(t)=\int_0^t E(t-\tau)g(\tau)\,d\tau \qquad (2')$$

This equation thus expresses the system response to an arbitrary driving force in terms of the response to a unit impulse, that is, an applied pulse which in the limit approaches unit area and infinitesimal duration. Thus it follows that a knowledge of the response $g(t)$ to a unit impulse is sufficient to specify completely the system performance. This implies in particular that the steady-state performance of a particular network may also be determined from a knowledge of $g(t)$ for that network. Suppose, for example, that the network is a filter passing a certain band of frequencies. This is then merely a reflection of the fact that $g(t)$ behaves in a very definite manner. To illustrate this in a general way, assume that a sinusoidal voltage $E(t)=E\sin\omega t$, where E represents the steady-state amplitude and $\omega$=the angular frequency, has been applied to the network at $t=0$; and that all transients have died out. The steady-state current can then be written as $$I(t)=E|Y_{12}(i\omega)|\sin[\omega t-\varphi(\omega)]= Ea_{12}(\omega)\sin\omega t+Eb_{12}(\omega)\cos\omega t \qquad (3)$$

where $Y_{12}(i\omega)$ is the transfer admittance between input and output terminals of the selected network and $\varphi(\omega)$ its phase angle. By writing $Y_{12}(i\omega)=a_{12}(\omega)+ib_{12}(\omega)$, in which $a_{12}$ and $b_{12}$ are constants, the second of expressions (3) is obtained. An equivalent expression may also be obtained from (2) or (2') by inserting $$E(t)=E\sin\omega t$$

and extending the range of integration to infinity (which means that transient distortion has died out) one obtains, $$I(t)=E\sin\omega t\int_0^\infty \cos\omega t g(\tau)d\tau - E\cos\omega t\int_0^\infty \sin\omega\tau g(\tau)d\tau \qquad (4)$$

By comparison of (3) and (4) it follows that $$\left.\begin{aligned} a_{12}(\omega)&=\int_0^\infty \cos\omega\tau g(\tau)d\tau \\ \text{and}\quad b_{12}(\omega)&=-\int_0^\infty \sin\omega\tau g(\tau)d\tau \end{aligned}\right\} \qquad (5)$$

The points to be emphasized in general are, first, that the Expressions 5 establish quantitative relations between the frequency selection properties of the networks and the response to unit impulse excitation; and second, that both the real and imaginary components of the transfer admittance can be calculated from a knowledge of the response to unit impulse. This relationship may also be further illustrated as follows: Multiply the second of Equations 5 with $i$, the imaginary unit, and add to the first; then use Euler's formula. The result is $$Y_{12}(i\omega)=\int_0^\infty g(\tau)e^{-i\omega\tau}d\tau \qquad (6)$$

from which it follows that the steady-state transfer admittance is the Fourier transform of the unit impulse response. From a principal point of view, it is thus irrelevant whether frequency selection properties of a network are stated in terms of steady-state frequency response to sinusoidal driving forces or whether they are given as the time response to a unit impulse. The frequency response is merely the spectral analysis of the time response to a unit impulse. It also follows from (6) that $$g(t)=\frac{1}{\pi}\int_0^\infty |Y_{12}(i\omega)|\cos[\omega\tau+\theta(\omega)]\,d\omega \qquad (7)$$

where $Y_{12}(i\omega)$ denotes the amplitude and $\theta(\omega)$ the phase of the steady-state transfer admittance. Equation 7 in principle allows $g(t)$ to be calculated from a knowledge of the frequency spectrum of the steady-state transfer admittance, i. e., from the amplitude frequency and phase characteristics of the network. Moreover, we have from (5)

$$\left.\begin{aligned} g(t)&=\frac{2}{\pi}\int_0^\infty a_{12}(\omega)\cos\omega t d\omega \\ \text{and}\quad g(t)&=-\frac{2}{\pi}\int_0^\infty b_{12}(\omega)\sin\omega t d\omega \end{aligned}\right\} \qquad (8)$$

Hence it follows that the time response $g(t)$ to unit impulse is completely determined when either the real or the imaginary component of the steady-state transfer impedance is specified over the entire frequency range.

Stressing the physical interpretation of the facts presented rather than the mathematical analysis, three steps are suggested by means of which an applied input function may be modified in accordance with certain admittance characteristics to produce a desired output response without resort to the conventional concepts of frequency selective networks. They are:

(1) Recording or storage of the input wave;

(2) Weighting of the stored record by means of selected $g$-functions; and (3) Summation of the weighted record.

These are fundamental steps which can serve as building blocks in frequency selective devices operating on a time-function basis. It should be noted that in arriving at these steps no reference has been made to vibrating systems such as coil and condenser combinations nor has any use been made of the concepts of amplitude and phase versus frequency response. These concepts have now been replaced by the single concept of the "*g-function*." In other words, the physical phenomena conventionally described by the amplitude and phase versus frequency functions are now described by the single function $g(t)$.

As concrete examples of "$g$-functions," consider two cases of functions in which the positive and negative values are symmetrical with respect to a certain value of time, say time $T_0$, where $T_0>0$. Consider first a low-pass filter having a uniform transfer impedance equal to K from frequency zero to a cut-off frequency $\omega_c$. Outside this range it its assumed that no transmission occurs. As a consequence of the stipulation of even time response, the phase shift $\theta(\omega)$ is linear and is given by the following equation:

$$\theta(\omega)=-\omega T_0+n\cdot 2\pi \qquad (9)$$

For the low-pass filter under consideration there is obtained a particular "$g$-function," which will be designated $g_1(t)$, by substituting the above conditions in Equation 7 which relates to the generalized function $g(t)$, and integrating the expression over a chosen range of angular frequencies from zero to $\omega_c$.

$$g_1(t)=\frac{1}{\pi}\int_0^{\omega_c}\cos(\omega t-\omega T_0)Kd\omega$$

or $\qquad (10)$ $$g_1(t)=\frac{\omega_c K}{\pi}\frac{\sin[\omega_c(t-T_0)]}{\omega_c(t-T_0)}$$

This function is shown as Fig. 2(A). It may be demonstrated that the width of the main oscillatory lobe is inversely proportional to the band width $f_c$. It is also seen that the received signal reaches its maximum at the time $t=T_0$ and that the maximum response is proportional to the area $\omega_c K$ under the amplitude characteristic.

As a second example we consider an idealized band-pass filter of even time response and with a flat amplitude characteristic between the cut-off frequencies $\omega_{c_1}$ and $\omega_{c_2}(\omega_{c_2}>\omega_{c_1})$. Outside this frequency range it is assumed that no transmission can take place. From (7), substituting the conditions imposed by Equation 9, and integrating over the angular frequency range from $\omega_{c_1}$ to $\omega_{c_2}$, there is obtained a function which will be designated $g_2(t)$, which represents the particular case of the generalized "$g$-function" $g(t)$ as applied to an idealized band-pass filter having the above characteristics.

$$g_2(t)=\frac{K}{\pi}\int_{\omega_{c_1}}^{\omega_{c_2}}\cos(\omega t-\omega T_0)d\omega$$

which may be reduced to $$g_2(t)=\frac{wK}{\pi}\frac{\sin\frac{w(t-T_0)}{2}}{\frac{w(t-T_0)}{2}}\cos\omega_m(t-T_0) \qquad (11)$$

Here $w$ represents the band width $\omega_{c_2}-\omega_{c_1}$ and $\omega_m$ the arithmetic mean of the two cut-off frequencies $\omega_{c_1}$ and $\omega_{c_2}$ and may thus be considered to coincide with the mid-band frequency. Equation 11 which is roughly plotted on Fig. 2(B) represents an amplitude modulated carrier wave with a carrier frequency equal to that of mid-band. The maximum response occurs at $t=T_0$ and is proportional to $w$K which is the area under the amplitude response characteristic and the length of the main oscillatory lobe is $$\frac{4\pi}{w}$$

which is inversely proportional to the band width.

The examples selected show that several important properties of the steady-state characteristics can be obtained directly from an inspection of the plots of the "$g$-functions." It must be emphasized, however, that too much significance cannot be attached to the calculated "$g$-functions" since they are based upon assumptions which cannot be realized. On the other hand, the general qualitative and quantitative properties of the "$g$-functions" for the filters in question are believed to have been preserved, although one is not justified in attaching too much significance to any of the finer details.

The computation of the "$g$-function," as discussed hereinbefore, has necessarily been in broad general terms, with several specific applications by way of illustration. From the previous discussion, the procedure will be apparent to those skilled in the art for uniquely computing "$g$-functions" to comply with specific sets of conditions imposed in other particular cases than those discussed.

In accordance with the present invention, the functions outlined hereinbefore, namely, (1) recording or storage of the input wave, (2) weighting of the stored record by means of selected "$g$-functions," and (3) summation of the weighted record, are carried out in a system comprising magnetic recording and reproducing units operating simultaneously at a plurality of separate points on a moving magnetic tape.

In a preferred embodiment, elements of which are shown in Figs. 3A, 3B, and 3C, and Figs. 4A, 4B, and 4C, the magnetic tape is moved past a pair of composite recording and reproducing devices, each of which comprises a single complex unit adapted to simultaneously operate on the tape magnetically at a multiplicity of points. The recording device, shown in the typical embodiment of Fig. 3A, comprises a pair of pole-pieces longitudinally disposed with respect to the moving tape so as to substantially form a hollow parallelepiped, the base of which is adjacent the surface of the moving tape and extending obliquely thereacross. For the purposes of illustration, the tape may be assumed to be moving in a horizontal plane. The tapered tape contacting members of the pole-pieces are separated by a narrow air-gap which extends obliquely across the width of the tape, aligned above which is a broader gap or recess between the upper portions of the pole pieces, into which is fitted a shaped element containing the recording coil. By means of a series of vertical planar non-magnetic separating elements, which extend parallel to the length of the tape the pole-pieces are divided across the width of the tape into a plurality of separate magnetic circuits, each responsive to operate on a different section of the moving magnetic tape.

Figures 3B, 3C, 4A:
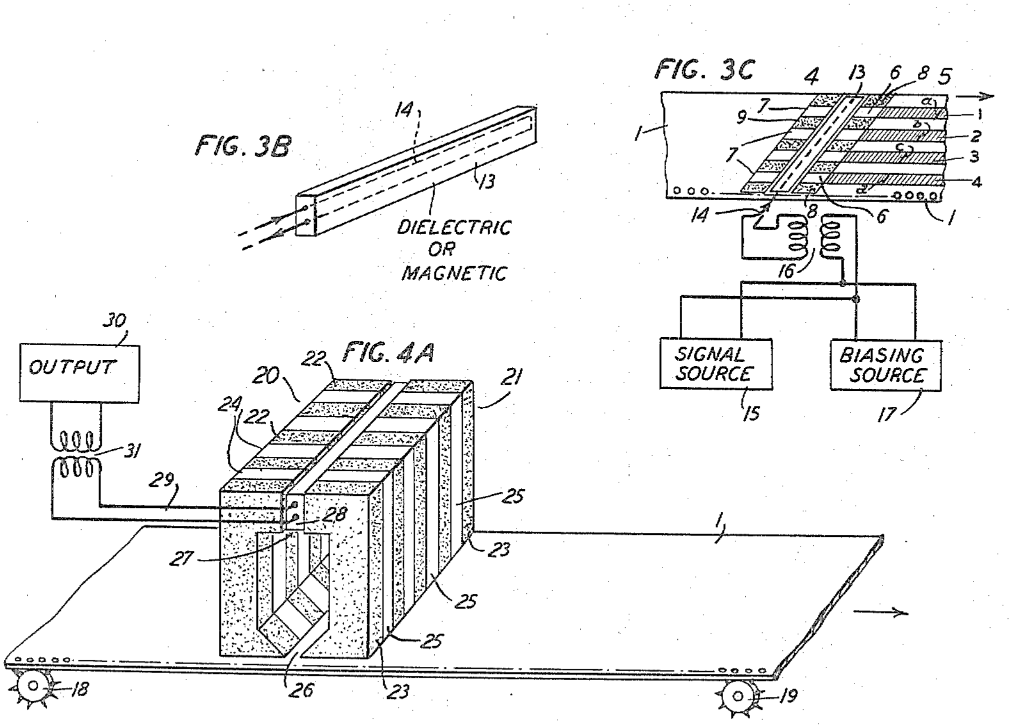
Fig. 3(B) shows an energizing coil adapted for insertion in the upper gap of the unit shown in Fig. 3(A)
Fig. 3(C) shows a plan view of the unit shown in Fig. 3(A)
Fig. 4(A) shows a composite reproducing device similar to that of 3(A) responsive to the moving magnetic tape at a plurality of operating points which are disposed at right angles to its length.

Fig. 3B shows in perspective the element containing the recording coil which comprises a matrix element shaped to fit into the obliquely extending upper recess between the pole-pieces. Moulded into the matrix element in a plane aligned with its long dimension is a pair of substantially straight parallel wires which are joined at one end to form a loop, the open end of which is coupled to the input signal source as shown in Fig. 3A.

Fig. 3C shows a plan view of the recording device of Figs. 3A and 3B. On the magnetic tape emerging from the device are indicated a plurality of longitudinally displaced records of the impressed input function.

The magnetic reproducing device shown in Fig. 4A comprises a pair of longitudinally disposed magnetic pole-pieces in contact with the moving magnetic tape from the recording device of Fig. 3A, and divided into a corresponding number of vertical planar magnetically responsive sections or laminations across the width of the tape. The reproducing device is similar in form to the recording device of Fig. 3A, except that the tape contacting base thereof is rectangularly shaped, so that the lower gap between the pole-pieces extends across the width of the tape normally to the direction of motion and the reproducing coil mounted in the upper gap is critically shaped as shown in Fig. 4B.

Figure 4B:
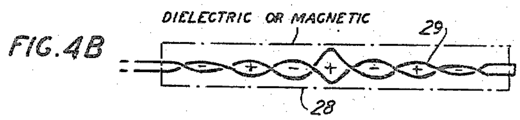
Fig. 4(B) shows an energizing coil adapted for insertion in the upper gap of the unit shown in Fig. 4(A), which is so designed as to vary the magnetic induction at the respective points of operation in accordance with a predetermined weighting function.

Fig. 4B shows a sectional view of a typical vertical-planar reproducing coil long enough to embrace all of the magnetic laminae, which is mounted in a matrix element similar to that of the recording coil of Fig. 3A, and which comprises a pair of wires bent into a series of loops in a vertical plane, the respective vertical dimensions of the loops corresponding to the coordinates of a chosen weighting function. The reproducing coil of Fig. 4B in its shaped matrix element is mounted in the upper gap between the pole-pieces of Fig. 4A as shown.

Figure 4D:
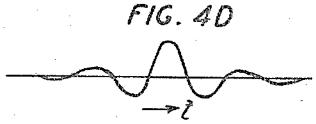
Fig. 4(D) shows the curve of a typical weighting function utilized to shape the reproducing coil 29 of Figs. 4(A) and 4(B).
Figure 4C:
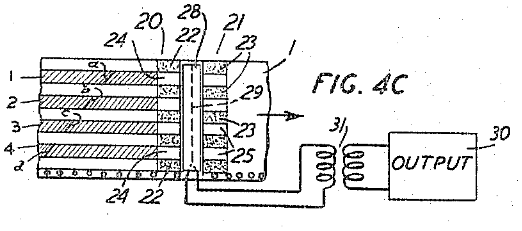
Fig. 4(C) shows a plan view of the unit shown in Fig. 4(A)

Fig. 4C shows a plan view of the reproducing unit operating on the multiple-record magnetic tape which is moved past its contacting base members at a uniform rate, whereby weighted increments of current are induced in different portions of the looped reproducing coil and continuously integrated in the output circuit producing output current filtered in accordance with a desired characteristic.

Referring in detail to Fig. 3A of the drawings, the recording tape 1 comprising a paramagnetic material such as stainless steel, having a width of several inches, and a thickness of the order of a few thousandths of an inch, is moved at a uniform rate from left-to-right across a given space interval by conventional means, such as, for example, the toothed wheels 2 and 3 which are synchronously driven by driving means, not shown, to rotate in a clock-wise direction operating on peripheral notches in the tape 1. For convenience of description, it will be assumed that the tape 1 is moving in a horizontal plane, and the other elements of the system will be described as assuming positions relative to a horizontal position of the tape, on which they will be assumed to have their bases.

The magnetic recording unit of Fig. 3A comprises two laminated pole-pieces 4 and 5 about an inch high, which are formed with inwardly extending flanges at the upper and lower ends, whereby their cross-sections are C-shaped. In each of the pole-pieces 4 and 5, the edges of the bases in contact with the tape 1 are in acute angular relationship, whereby, when the units are combined they substantially form a hollow parallelepiped extending obliquely across the width of the tape 1, the lower inwardly extending flanges thereof being tapered to include an obliquely extending air-gap 11 having a dimension of a few thousandths of an inch in the direction of passage of the tape thereacross. The spacing between the pole-pieces 4 and 5 broadens out to of the order of one-half inch between the mid-sections, and narrows down to an upper recess 12 between the upper flanges having a width and depth of the order of one-eighth of an inch, the upper recess 12 being aligned over the lower gap 11.

The pole-pieces 4 and 5 are subdivided across the width of the tape along the gap 11 and the recess 12 into an equal number of vertical magnetically responsive sections or laminae 6 and 7, comprising for example, soft iron by non-magnetic separating sections or laminae, 8 and 9, comprising for example, brass. The magnetic and non-magnetic sections 6, 7, and 8, 9 have equal width dimensions of a fraction of an inch each, so that the over-all dimension of the recording unit across the tape, depending on the number of sections, is of the order of two inches, and the over-all dimension along the tape is of the order of one inch.

Fig. 3B shows a perspective view of a matrix element 13 which fits into the recess 12. The matrix 13 may comprise either magnetic or non-magnetic material in which is embedded the recording coil 14, comprising parallel wires forming a loop, which extends somewhat beyond the length of the recess 12. As shown for clarity, the coil 14 may comprise a single loop or, preferably, many windings. In either case the shaping of the coil should be maintained so that the area enclosed is substantially a parallelogram disposed in a vertical plane aligned with the long edges of the matrix element 13. The open end of the coil 14 is coupled through the transformer 16 to the signal source 15, which may comprise a conventional generator of electrical signal current having a characteristic which varies as a function of time, on which it is desired to impress modifications in accordance with the teachings of the present invention. The biasing circuit 17, which is connected in parallel with the signal source 17, represents a conventional generator of oscillating biasing current, which has a frequency of the order of two or three times the highest frequency of the signalling source 15, and which when superposed on the input signal has the effect of increasing the linearity of response of the reproducing system.

From the plan view of the recording system shown in Fig. 3C, it is seen that a plurality of parallel spaced records I, II, III, and IV corresponding to the number of magnetic recording elements, are produced, such that points *a*, *b*, *c*, and *d*, representing identical instants in the history of the impressed input function appear in oblique relation across the width of the tape 1.

The tape 1, bearing the multiple records of the input function impressed from the signal source 15, is passed at a uniform rate through a magnetic reproducing system, such as will be described in detail with reference to Figs. 4A, 4B and 4C of the drawings. The tape 1 of Fig. 4A, which may be considered to be an extension of the tape 1 of Fig. 3A, is driven by the toothed wheels 18 and 19 which are driven synchronously with the toothed wheels 2 and 3 of Fig. 3A.

The magnetic reproducing unit of Fig. 4A, which is disposed with its base adjacent the moving tape 1, comprises laminated pole-pieces 20 and 21, which are sub-divided into respective magnetic and non-magnetic sections or laminae 22, 23 and 24, 25, corresponding in number to the elements of the pole-pieces 4 and 5 of Fig. 3A, and similarly shaped and dimensioned thereto, except that the base of the reproducing unit is substantially rectangular, whereby the lower gap 26 adjacent the recording tape, and the co-aligned upper recess 27 extend across the width of the tape in a direction substantially normal to the length of the tape 1.

Fig. 4B shows in side elevation a matrix element 28 which fits into the recess 27, and which may comprise either magnetic or non-magnetic material, such as the element 13 of Fig. 3B. In a vertical plane parallel to the long dimension of the element 28 is embedded the reproducing coil 29. The coil 29 is formed into a series of loops the vertical dimensions of which respectively vary in accordance with the ordinates of a chosen "$g$-function." The form of the coil 29, as shown by way of example, corresponds to a typical "$g$-function" such as shown in Fig. 4D, and the form of which is computed in accordance with the teachings set forth in the early part of the specification. The respective wires are insulated from one another at each point of crossover. It is noted that the relative positions of the input and output wires in each of the loops determines the polarity of the induced current whereby the recording unit is adapted to utilize weighting functions having components of either or both signs. The open end of the coil 29 is connected through the transformer 31 to the output terminals 30.

The plan view of Fig. 4C shows the assembled reproducing system, including the tape 1 bearing a plurality of parallel magnetic records I, II, III, and IV of the input function, which correspond in number to the separate magnetic circuits in the recording and reproducing devices, and which are displaced in time, so that the points $a$, $b$, $c$ and $d$, representing identical increments of the impressed input signal are fed through the gap 26 obliquely arriving at different instants in succession.

Assume that the signal at each of the points $a$, $b$, $c$ and $d$ on the identical parallel records I, II, III and IV is represented by E ($t_0$) and that an interval of time $t=\Delta T$ is required for the magnetic tape 1 to move from a position in which point $a$ on record I is adjacent the gap 26 to a position in which $b$ on record II is thereadjacent; and, moreover, assume that a time interval, $\tau=4\Delta T$, representing the time duration of the chosen "$g$-function," is required for the projected distance from $a$ to $d$ to be traversed by the motion of the tape 1.

Assume also, that the coil 29 representing the function $g(t)$ is so positioned in the gap 27 that its vertical cross-sectional dimension directly above record No. I is $g(t_0)$, above record No. II is $g(\Delta T)$, above record No. III is $g(2\Delta T)$, and above record No. IV is $g(3\Delta T)$.

If the instant when $a$ is adjacent the gap 26 is selected as $t=0$, then the magnetomotive forces impressed on each of the respective magnetic circuits by the moving tape 1 at that instant are as follows:

By record No. I, $M_I=E(t_0)$;
By record No. II, $M_{II}=E(t_0-\Delta T)$;
By record No. III, $M_{III}=E(t_0-2\Delta T)$; and
By record No. IV, $M_{IV}=E(t_0-3\Delta T)$.

Therefore, the current induced in an element $\Delta\tau$ of the coil 29 by each of the respective magnetic circuits is as follows:

$I_I=\alpha E(t_0)g(3t_0)\Delta\tau$
$I_{II}=\alpha E(t_0-\Delta\tau)\Delta\tau$
$I_{III}=\alpha E(t_0-2\Delta\tau)g(2\Delta\tau)\Delta\tau$; and
$I_{IV}=\alpha E(t_0-3\Delta\tau)g(3\Delta\tau)\Delta\tau$, where $\alpha$ is determined by the constants of the system.

Now if the output currents represented above are summed and the sum presented in generalized terms indicating a recording and reproducing system having $n$ magnetic circuits, the total output current at time $t=0$ may be represented as follows:

$$I_{t=0}=\sum_{\tau=0}^{\tau=n\Delta\tau}E(t-\tau)g(\tau)\Delta\tau \qquad (12)$$

In the above equation, $\tau$ varies through integral values from 0 to $n\Delta\tau$, where $n\Delta\tau$ is the period required to completely represent the chosen "$g$-function."

It is thus seen that the output current at each instant represents an approximation of the response integral of the form given in Equation 2 in the early part of the specification. It is thus apparent that the magnetic recording and reproducing device described in the foregoing paragraphs can be constructed in such form as to simulate the transfer impedance of any chosen network, if the recording coil 29 is constructed to represent the "$g$-function" corresponding to the desired admittance characteristic. Although in order to simplify description the recording and reproducing units of Figs. 3A and 4A have been disclosed as each comprising only four magnetic circuits, a practical system in accordance with the present invention would preferably comprise many times that number.

Assuming that the velocity of the recording operation is equal to the velocity of the reproducing operation, the obliquity of the air-gap 11 and the recess 12 in the recording device of Fig. 3A, should be such that the projected distance along the edge of the tape between points $a$ and $d$ is preferably made at least equal to $\tau$, the duration of the chosen "$g$-function." Moreover, if the ratio of the reproducing velocity to the recording velocity is other than unity, the projected distance X between points $a$ and $d$ should preferably be made at least equal to $\tau$ multiplied by this ratio.

The principles of the invention may be equally well applied to a system in which the recording gap 11 and the recess 12 are disposed at right angles to the direction of motion of the tape, and the reproducing gap 26 and the recess 27 are disposed obliquely with respect to the tape. It is also apparent that the same resultant output current may be obtained by shaping the recording coil 14 in accordance with the chosen "$g$-function" instead of the reproducing coil 29, as disclosed.

Moreover, other variations of the invention will be apparent to those skilled in the art, such as a system utilizing a single magnetic record of the input function which is passed through a reproducing device having an air-gap disposed along the length of the tape, and operating at a plurality of pick-up points therealong.

From the foregoing discussion, it will be apparent that the principles of the present invention can be embodied in many other forms than those specifically disclosed herein.

What is claimed is:

1. In a magnetic recording-reproducing system in combination, a magnetic recording tape, an electromagnetic recording device which includes a core comprising alternate laminae of magnetic and non-magnetic material, said core constructed to include a pair of elongated gaps which cut a plurality of said laminae, driving means to progressively move said magnetic recording tape in transducing relation to a first one of said gaps in said recording device, an electrical signal source, an elongated recording coil recessed in the second gap of said recording device with its major dimension in transverse relation to the magnetic laminae of said core, said recording coil disposed in flux linking relation to a plurality of said laminae, said recording coil coupled to said signal source whereby a plurality of magnetic records of said signal corresponding to the number of said laminae are impressed on said recording tape by said recording device, an electromagnetic reproducing device disposed to respond to the plural magnetic records of said tape, said reproducing device including a core comprising alternate laminations of magnetic and non-magnetic material, said core including a pair of elongated gaps which cut a plurality of said laminae transversely, said driving means disposed to progressively move said magnetic recording medium in transducing relation to the first one of said gaps in said reproducing device, an elongated reproducing coil recessed in the second gap in said reproducing device with its major dimension in transverse relation to the magnetic laminae of said core, said reproducing coil disposed in flux linking relation to a plurality of said laminae, and an output circuit in energy transfer relation with said reproducing coil.

2. In combination with a magnetic recording-reproducing system which includes a magnetic tape having a recording surface, a magnetic transducer operative on said tape which comprises a pair of elongated core members of C-shaped cross-section which form a hollow structure including a pair of elongated gaps extending in a direction transverse to the length of said tape, only one of said gaps disposed in transducing relation with said recording surface, said core members separated in said transverse direction into a multiplicity of separate magnetic circuits comprising laminations of magnetic material arranged in alternating relationship with laminations of non-magnetic material, said laminations disposed in a series of parallel planes substantially normal to the long dimension of said gaps, a matrix element dimensioned to fit into a second of said gaps and substantially coextensive therewith, an elongated coil substantially coextensive with the long dimension of said matrix element and inserted therein in flux linking relation to each of said magnetic circuits.

3. A magnetic transducer in accordance with claim 2 in which the major axes of said gaps are obliquely dimensioned with respect to the direction of travel of said tape.

4. A magnetic transducer in accordance with claim 2 in which said coil is shaped along its length to enclose a multiplicity of juxtaposed areas of different dimensions adjacent respectively different ones of said laminae in a cross-sectional plane defined by the length and the depth of said second gap.

5. A magnetic transducer in accordance with claim 2 in which said matrix element is readily movable from said second gap.

6. A magnetic transducer comprising in combination a hollow core comprising a stack of alternately magnetic and non-magnetic laminae having two gaps therein extending through said laminae lengthwise of the stack and dividing the core into two portions, a magnetic recording ribbon, said core disposed with one of said gaps extending transversely across said magnetic ribbon in transducing relation therewith, and an electrical circuit disposed in the other of said gaps linking the flux paths between juxtaposed ends of the several magnetic laminae in varying proportion and polarity.

7. A system in accordance with claim 1 in which an oblique angular relationship exists between the directions at which the gaps in said recording device and said reproducing device respectively extend across the width of said tape.

8. A system in accordance with claim 1 in which at least one of said coils is shaped to intercept substantially different amounts of flux adjacent different ones of the laminae in the respective core.

9. A filter system comprising an input circuit, an output circuit, a magnetic recorder and a magnetic reproducer disposed at spaced points along a movable magnetic record carrier in wave transducing relation therewith, said recorder comprising a unitary structure having a multiplicity of distinct portions all coupled to said input circuit and adapted to record at respectively different corresponding laterally separated points on said magnetic record carrier whereby an electrical signal appearing in said input circuit is simultaneously recorded in respectively corresponding laterally separated tracks along said magnetic record carrier, said reproducer comprising a unitary structure having a multiplicity of distinct portions all coupled to said ouput circuit and adapted to reproduce from respectively different corresponding ones of said laterally separated tracks, said reproducer portions being differently spaced from said recorder portions whereby the signal reproduced by each of said reproducer portions is in time-displaced relation with the signal reproduced by each of the other said reproducer portions, said coupling to at least one of said circuits being varied from one to another of said multiplicity of portions in accordance with a predetermined weighting function.

RALPH K. POTTER.

REFERENCES CITED

The following references are of record in the file of this patent:

UNITED STATES PATENTS

| Number | Name | Date |
|---|---|---|
| 2,195,192 | Schuller | Mar. 26, 1940 |
| 2,327,956 | Begun | Aug. 24, 1943 |
| 2,344,615 | James | Mar. 21, 1944 |
| 2,351,003 | Camras | June 13, 1944 |
| 2,354,176 | Goldsmith | July 18, 1944 |

FOREIGN PATENTS

| Number | Country | Date |
|---|---|---|
| 693,956 | Germany | Aug. 24, 1943 |